United States Patent
Bachelay et al.

(10) Patent No.: US 6,606,013 B2
(45) Date of Patent: Aug. 12, 2003

(54) EQUALIZING DEVICE FOR CABLE DISTRIBUTION NETWORK

(75) Inventors: Alain Bachelay, Caudebec Ies Elbeuf (FR); Pascal Rouet, Gouy (FR); Vincent Magnin, La Croix St. Leufroy (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 92 days.

(21) Appl. No.: 09/994,362

(22) Filed: Nov. 26, 2001

(65) Prior Publication Data

US 2002/0113665 A1 Aug. 22, 2002

(30) Foreign Application Priority Data

Nov. 28, 2000 (FR) .............................. 00 15353

(51) Int. Cl.[7] ................................................ H04B 3/04
(52) U.S. Cl. ...................................... 333/28 R; 333/18
(58) Field of Search .................................. 333/28 R, 18

(56) References Cited

U.S. PATENT DOCUMENTS 4,250,459 A    2/1991   Haass .......................... 330/145
5,343,158 A *  8/1994   Gris et al. .................... 328/103
5,841,810 A * 11/1998   Wong et al. .................. 375/232

FOREIGN PATENT DOCUMENTS

EP           0529734 B1      3/1993    .......... H04N/7/173

* cited by examiner

Primary Examiner—Robert Pascal
Assistant Examiner—Stephen E. Jones
(74) Attorney, Agent, or Firm—Michael E. Belk

(57) ABSTRACT

The invention relates to an equalizing device (62) intended to be used in a signal processing device (30) of a cable distribution network (1). The equalizing device according to the invention comprises two branches (B1, B2) brought together at the input (IN) and output (OUT) via two diplexers (SS, RC). At least either of the two branches includes an attenuator (V1, V2, V3). The passband of the two diplexers is determined to compensate for the faults caused by the distribution network. Advantageously, either of the two branches comprises an attenuator which is adjustable. The control of the adjustable attenuator is local or remote. The shape of the frequency response of such an equalizing device is regular when the value of the attenuation varies.

10 Claims, 3 Drawing Sheets

EQUALIZING DEVICE FOR CABLE DISTRIBUTION NETWORK

FIELD OF THE INVENTION

The invention relates to a signal distribution cable network which comprises a network head end and at least a cable along which at least a signal processing device is inserted. The invention also relates to said signal processing device and also to an equalizing device that may be used in such signal processing device.

The invention notably applies to very broadband networks (40 MHz–860 MHz) for cable television signal distribution networks.

BACKGROUND OF THE INVENTION

U.S. Pat. No. 4,250,459 describes an equalizing device comprising a first branch having a high-pass filter serially connected with an adjustable attenuator and a second branch comprising a resistor. Such a device is used in a cable distribution network in order to compensate for the attenuation introduced by the cable on the transmitted signals, notably on the high frequencies.

The invention proposes another embodiment of such an equalizing device intended to be used for another application.

SUMMARY OF THE INVENTION

An equalizing device according to the invention comprises a first and a second branch which are connected:

- at the input via a signal separation device intended to separate the frequencies of an input signal for producing a signal that occupies a first frequency band via the first branch, and a signal that occupies a second frequency band via the second branch,
- and at the output via a recombining device intended to produce an output signal that occupies the first and second freguency bands based on the signals transmitted by the first and the second branch, wherein the first and second frequency bands correspond to a cutting off of a useful frequency band between a low part and a high part the first and second branches each include at least an attenuator, while the attenuation of the first attenuator is higher than that of the second attenuator, and the separation and recombining devices having a passband designed in such a way that the output signal has a substantially constant amplitude in said first and second frequency bands.

The invention thus comprises separating the input signal so as to separately process a first and a second frequency band. The intended processing is an attenuation of the signal. Equalizing the signal by attenuating it permits to avoid the problems of saturation and noise, and also to reduce the consumption of the equalizing device. The attenuation caused by the first and/or second branch varies in frequency. This frequency variation is determined by the passband of the separation and combining devices.

The invention advantageously applies to the particular case where a VHF distribution network is made to evolve into a very broadband distribution network. The VHF distribution networks utilize passive components which may cause faults to occur in the very high frequency bands. These faults lack amplitude. They vary with frequency. If one makes a VHF network evolve into a very broadband network, these passive components are thus to be replaced, which is expensive. This replacement may be avoided by utilizing a first embodiment of an equalizing device according to the invention. The equalizing device of the invention delivers an output signal which has a constant amplitude. Advantageously, the second attenuator is an adjustable attenuator which can have a local or remote control. The attenuation caused by the second attenuator may thus be adapted on a case-by-case base as a function of the distribution network, to compensate exactly for really introduced faults.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF PREFERRED EMBODIMENTS

Figure 1:
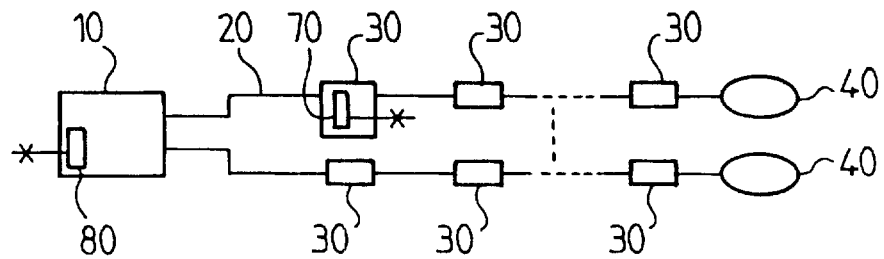
FIG. 1 represents a diagram of an example of a distribution network according to the invention.

FIG. 1 shows an example of a distribution network 1 according to the invention. The network 1 comprises a head end station 10, cables 20, signal processing devices 30 inserted in the cables at more or less regular distances, and user terminals 40. The cables 20 are used for transmitting signals from the head end of the network 10 to the users 40 along a downlink path and for bringing the signals transmitted by the users 40 back to the network head end 10 along an uplink path. The signal processing devices 30 have for their function to process the signals transmitted over the cable at the end of a certain cable distance. Within the scope of the invention, this processing comprises an equalization and an amplification of the signals transmitted over the uplink and downlink paths.

Advantageously, the signal processing devices 30 and the network head end 10 comprise transmission means 70 and receiving means 80. These means permit the network head end to remote control the signal processing devices 30.

Figure 2:
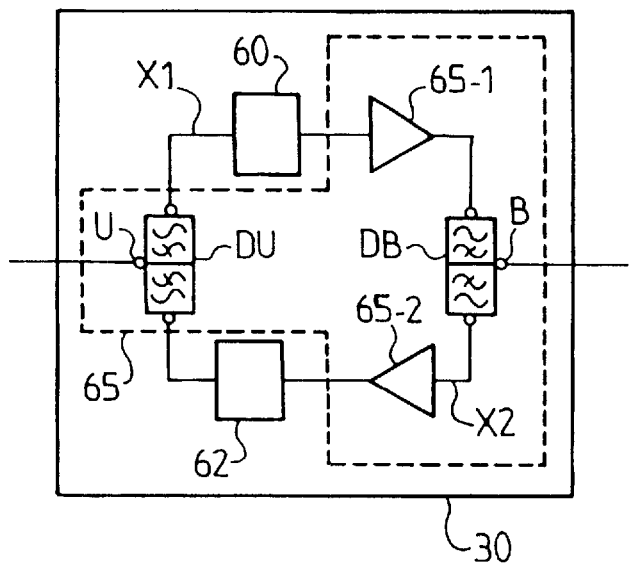
FIG. 2 is a diagram of an example of a signal processing device according to the invention.

In FIG. 2 is represented a first example of a signal processing device according to the invention.

In this first example, the signal processing device 30 comprises:

- an equalizing device 60 according to the invention whose function is to compensate for the faults caused in the downlink path by the distribution network, whatever these faults are, a conventional equalizing device 62 for equalizing the signals transmitted over the uplink path, and an amplifier device 65 for amplifying the signals transmitted over the uplink path and downlink path, which is, for example, of the type described in cited European patent.

Thus, according to FIG. 2, the signal processing device 30 has an input U and an output B to which are connected two signal separation devices DU and DB, also called diplexers, and which have for their function to separate the downlink and the uplink path X1 and X2, respectively. The signals of the downlink path X1 are transmitted from the input U to the output B via the equalizing device 60 and an amplifier 65-1. The signals of the uplink path X2 are transmitted from the input B to the output U via the equalizing device 62 and an amplifier 65-2. The order in which the amplifiers and equalizing devices are connected is irrelevant.

As the transmission over the uplink path is less critical than the transmission over the downlink path, it is generally sufficient to utilize a conventional equalizing device on the uplink path. But it is certainly possible also to utilize an equalizing device according to the invention on the uplink path.

Figure 3:
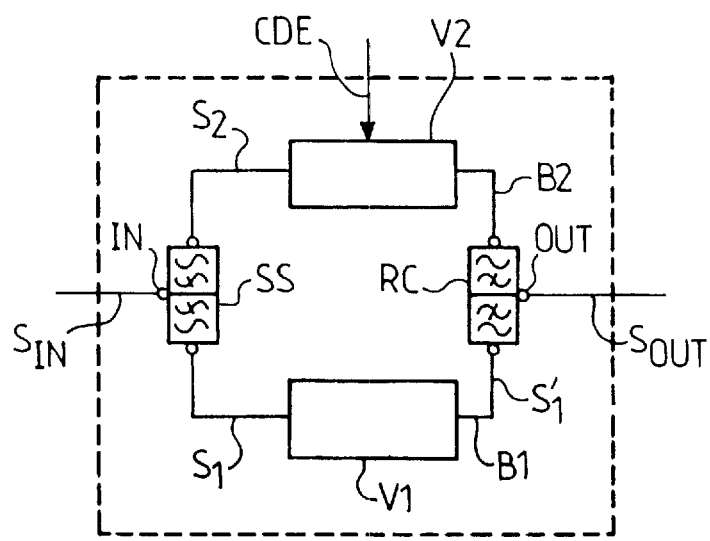
FIG. 3 is a diagram of an example of an embodiment of an equalizing device according to the invention.

FIG. 3 shows an example of an embodiment of an equalizing device according to the invention, which is applicable for making a VHF network evolve into a very broadband network. In this embodiment the equalizing device comprises a first and a second branch B1 and B2 combined at the level of an input IN and output OUT of the equalizing device.

At the level of the input IN, the two branches B1 and B2 are combined by a signal separation device SS (also called diplexer) intended to separate the frequency of an input signal $S_{IN}$ to deliver on the first branch B1 a signal $S_1$ which occupies a first frequency band, and on the second branch B2 a signal $S_2$ which occupies a second frequency band. In this first embodiment the first frequency band is formed by the VHF band situated between 40 MHz and 500 MHz, and the second band is formed by the UHF band situated between 500 MHz and 860 MHz.

At the level of the output OUT, the two branches B1 and B2 are combined by a recombining device RC (also called diplexer) intended to deliver an output signal $s_{OUT}$ which occupies the first and the second frequency band, based on the signals $S'_1$ and $S_2$ produced by the first and second branch, respectively.

The branch B1 includes a first attenuator V1 and the branch B2 a second attenuator V2. The attenuation caused by the first attenuator V1 is higher than that caused by the second attenuator V2.

The attenuation caused by the branch B2 is to have an inverse shape of the fault one wishes to correct. Since the fault caused by the distribution network in the upper part of the 500 MHz–860 MHz band increases with the frequency under consideration, the attenuation caused by the branch B2 is to diminish when the frequency increases. This frequency variation of the attenuation is determined by the passband of the diplexers SS and RC. Finally, the output signal $S_{OUT}$ has a substantially constant amplitude in the 40 MHz–860 MHz band.

Advantageously, the second attenuator V2 is adjustable. This permits of the modification of the parameters of the attenuator V2 as a function of the distribution network so as to exactly compensate for the faults really caused. The adjustable attenuator can be controlled locally or remotely.

Figure 4:
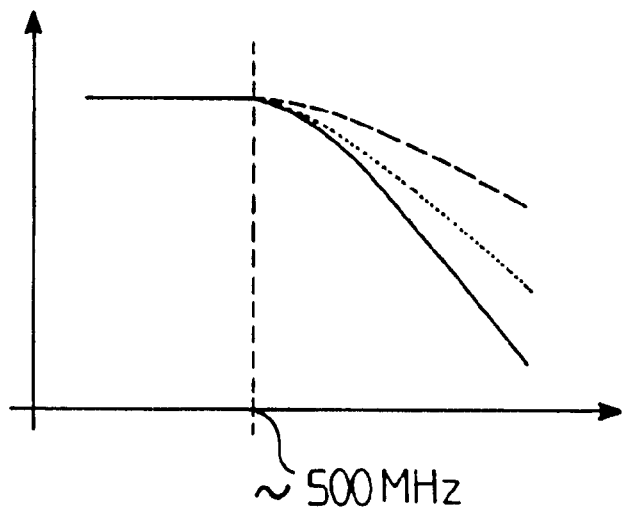
FIG. 4 shows the shape of the frequency response of an equalizing device for various adjustments of the variable attenuator for the first embodiment.

FIG. 4 shows the shape of the frequency response of the equalizing device of FIG. 3 when the input signal $s_{IN}$ has a constant amplitude, for various adjustments of the second attenuator V2 (the X-axis indicates frequency, the Y-axis indicates amplitude).

In an advantageous manner, the separation device SS and recombining device RC are identical and are of the type described in European patent no 529.734 B1.

They comprise:

a port P1 connected to the input IN of the equalizing device, a port P2 connected to the first branch B1, and a port P3 connected to the second branch B2, a main low-pass filter element L1 connected between the first and the second port P1 and P2, a main high-pass filter element C1 connected between the first and the third port P1 and P3, and a reaction adaptation and canceling circuit A connected between the second and the third port.

The filter elements are formed by a single capacitor or inductance or by more complex filter circuits.

Various examples of reaction adaptation and canceling circuits A are described with reference to FIGS. 5 to 7. These examples are not limiting and many variants may be contemplated.

Figure 5:
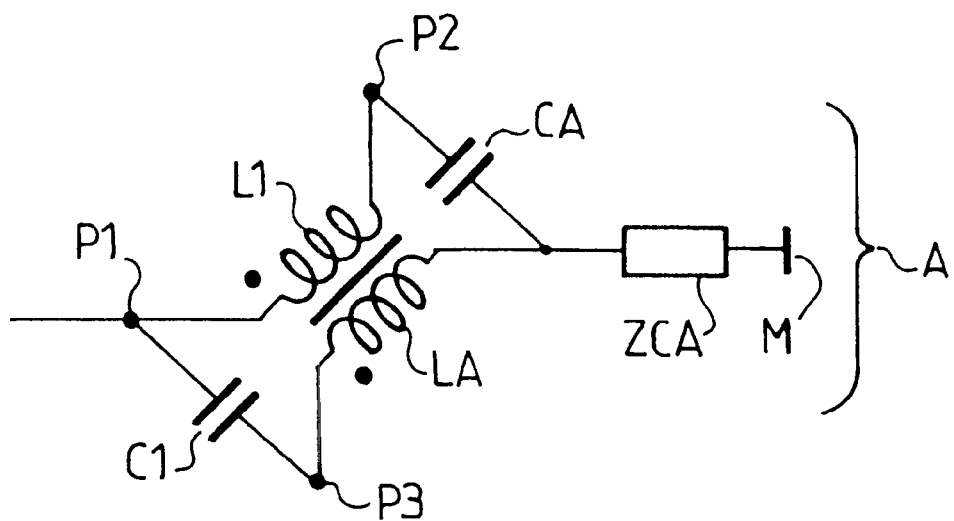
FIG. 5 is a diagram of a first example of a diplexer advantageously used in an equalizing device according to the invention.

According to FIG. 5, the reaction adaptation and canceling circuit A comprises an additional low-pass filter element LA connected to the third port P3 and combined in series with an additional high-pass filter element CA which is connected to the second port P2. The point Q which is shared by said additional filter elements is connected to ground M via an adapted load ZCA, and a magnetic coupling is provided between the main low-pass filter element L1 and the additional low-pass filter element LA. The assembly constituted by the main and additional filter elements is balanced, that is to say, that the values of the two low-pass filter elements are substantially identical, as are those of the two high-pass filter elements.

Figure 6:
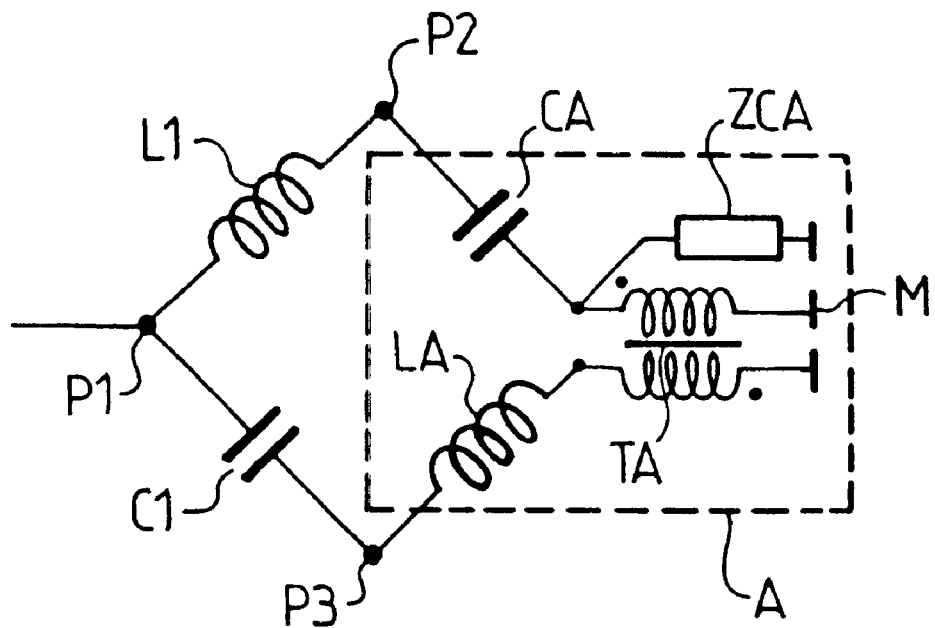
FIG. 6 is a diagram of a second example of a diplexer advantageously used in an equalizing device according to the invention.

According to FIG. 6 the reaction adaptation and canceling circuit A comprises an additional low-pass filter element LA, an additional high-pass filter element CA, an adapted load ZCA, and a transformer TA which has a first and a second winding which have two ends each. The additional low-pass filter element LA is connected between the third port P3 and one end of the first winding. The additional high-pass filter element CA is connected between the second port P2 and one end of the second winding. The two other ends of the windings are connected to ground M. The adapted load ZCA is connected in parallel with either of the two windings. Finally, the assembly formed by the main and additional filter elements is balanced.

Figure 7:
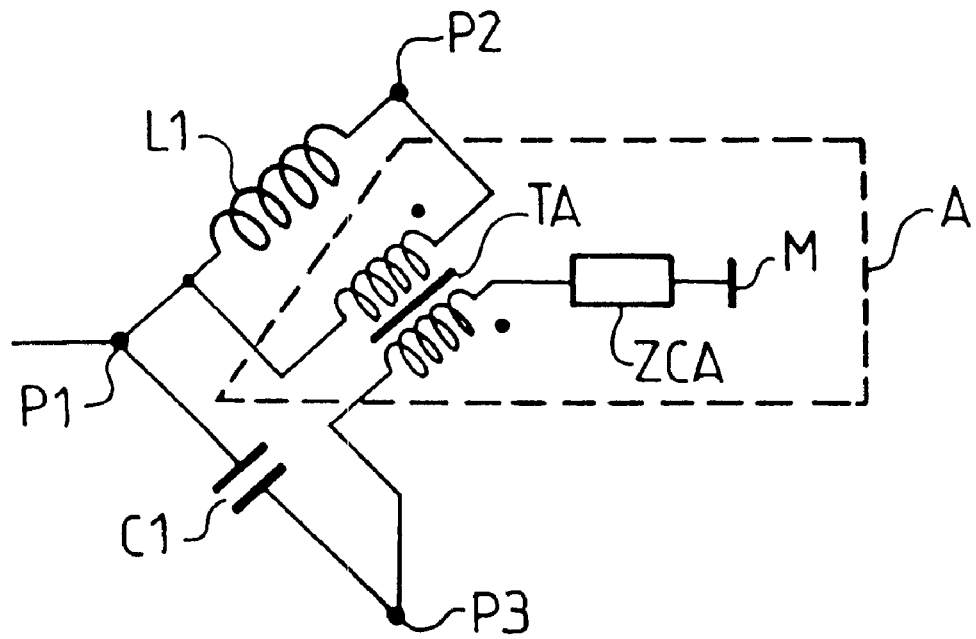
FIG. 7 is a diagram of a third example of a diplexer advantageously used in an equalizing device according to the invention.

According to FIG. 7 the reaction adaptation and canceling circuit A comprises a transformer TA which has a first winding, connected in parallel with the main low-pass filter element L1, and a second winding connected, on the one hand, to ground via an adapted load ZCA and, on the other hand, to the third port P3.

By way of example the following values are used:

–ZCA=Ro–75 Ohms, Ro being the characteristic working impedance, $$-L1 = LA = \frac{Ro\sqrt{2}}{\omega},$$

with ω=2π.f, where f is the cut-off frequency of the filter elements of the diplexer.

$$-C1 = CA = \frac{\sqrt{2}}{2 \cdot Ro \cdot \omega}$$

The attenuators, which are inserted in the first and the second branch, are to be perfectly adapted. In a conventional manner an attenuator is formed, for example, by three resistors connected at T or at π. When the attenuator is adjustable, for example, variable resistances are used formed by PIN diodes. An alternative consists of the use of a network of fixed resistors connected to interrupters.

The adjustment of the attenuator is modified by applying an instruction CDE to the adjustable attenuator. This instruction is, for example, transmitted by the network head end 10. In another example this instruction is produced locally, possibly by using a remote control.

The invention is not restricted to the two embodiments that have just been described by way of example. For other applications there may be considered to divide the useful frequency band in a different manner to obtain a first and a second frequency band and attenuations may be applied that have a different shape from those that have just been described.

What is claimed is:

1. An equalizing device comprising:
    a first and a second branch which are connected;
    an input via a signal separation device to separate the frequencies of an input signal for producing a signal that occupies a first frequency band via the first branch, and a signal that occupies a second frequency band via the second branch; and
    at output via a recombining device to produce an output signal which occupies the first and second frequency bands based on the signals transmitted over the first and the second branch;
    and wherein:
        the first and second frequency bands correspond to a cutting off of a useful frequency band between a low part and a high part;
        the first and second branches each include at least an attenuator, while the attenuation of the first attenuator is higher than that of the second attenuator; and
        the separation and recombining devices having a passband designed in such a way that the output signal SOUT has a substantially constant amplitude in said first and second frequency bands.

2. The device of claim 1, wherein said signal separation device and said recombining device include a first, second and third port, a main low-pass filter device connected between said first and second port, a main high-pass filter element connected between said first and third port, and a reaction adaptation and canceling circuit connected between the second and third port.

3. The device of claim 2, wherein the reaction adaptation and canceling circuit comprises a transformer which includes a first winding connected in parallel with said main low-pass filter element and a second winding connected, on the one hand, to ground via an adapted load and, on the other hand, to said third port.

4. The device of claim 2, wherein the reaction adaptation and canceling circuit comprises an additional low-pass filter element connected to the third port and combined in series with an additional high-pass filter element which is connected to said second port, the point shared by said additional filter elements being connected to ground via an adapted load, and a magnetic coupling being provided between the main and additional low-pass filter elements, the assembly in the form of the main and additional filter elements being balanced.

5. The device of claim 2, wherein the reaction adaptation and canceling circuit comprises an additional low-pass filter element, an additional high-pass filter element, an adapted load, and a transformer which includes a first and a second winding which have each two ends, said additional low-pass filter element being connected between said third port and one end of the first winding, said additional high-pass filter element being connected between said second port and an end of said second winding, the two other ends of said windings being connected to ground, said adapted load being combined in parallel with any one of said windings, and the assembly in the form of the main filter elements and additional filter elements being balanced.

6. The device of claim 1, wherein at least one of said attenuators is an adjustable attenuator.

7. A signal processing device for inserting in a cable of a signal distribution network, said device comprising the equalizing device of claim 1.

8. The processing device of claim 7, wherein it comprises at least a first and a second input/output to which are connected two separating/recombining devices whose function is to separate and recombine, respectively, signals transmitted by a downlink path and over an uplink path, the signals of the downlink path being transmitted from the first input/output to the second input/output via said equalizing device and a first amplifier, and the signals of the uplink path being transmitted from the second input/output to the first input/output via another equalizing device and a second amplifier.

9. The signal processing device of claim 7, wherein it comprises transceiver means for communication with a remote device, notably for controlling said attenuator when the latter is adjustable.

10. A cable network for signal distribution, comprising a network head end and at least a cable along which at least the signal processing device of claim 7 is inserted.

* * * * *